(12) United States Patent
Huang et al.

(10) Patent No.: US 7,926,330 B2
(45) Date of Patent: Apr. 19, 2011

(54) DETECTION OF CYLINDER-TO-CYLINDER AIR/FUEL IMBALANCE

(75) Inventors: Zhe Huang, Farmington Hills, MI (US); Richard Hankins, Westland, MI (US)

(73) Assignee: DENSO International America, Inc., Southfield, MI (US)

( * ) Notice: Subject to any disclaimer, the term of this patent is extended or adjusted under 35 U.S.C. 154(b) by 326 days.

(21) Appl. No.: 12/319,084

(22) Filed: Dec. 30, 2008

(65) Prior Publication Data

US 2010/0162806 A1 Jul. 1, 2010

(51) Int. Cl.
*G01M 15/04* (2006.01)
(52) U.S. Cl. .................................... 73/114.38
(58) Field of Classification Search ............... 73/114.38, 73/114.42, 114.52, 114.53
See application file for complete search history.

(56) References Cited

U.S. PATENT DOCUMENTS

| 5,576,963 | A | 11/1996 | Ribbens et al. |
|---|---|---|---|
| 6,314,952 | B1 | 11/2001 | Turin et al. |
| 6,382,198 | B1 | 5/2002 | Smith et al. |
| 6,668,812 | B2 | 12/2003 | Javaherian |
| 7,027,910 | B1 | 4/2006 | Javbaherian et al. |
| 7,152,594 | B2 | 12/2006 | Anilovich et al. |
| 2009/0260347 | A1 * | 10/2009 | Iwazaki et al. .................. 60/277 |

* cited by examiner

*Primary Examiner* — Eric S McCall
(74) *Attorney, Agent, or Firm* — Harness, Dickey & Pierce, PLC

(57) ABSTRACT

An air/fuel imbalance detection module includes a fueling control module, a response time determination module, and a comparison module. The fueling control module commands a fueling change according to a predetermined fueling pattern. The response time determination module determines a measured response time for a wide-range air/fuel sensor (WRAF) to output a predetermined voltage. The comparison module compares the measured response time with a reference time range and diagnoses air/fuel imbalance when the measured response time is outside the reference time range.

19 Claims, 5 Drawing Sheets

DETECTION OF CYLINDER-TO-CYLINDER AIR/FUEL IMBALANCE

FIELD

The present disclosure relates to internal combustion engines, and more particularly to detection of cylinder-to-cylinder air/fuel imbalance in internal combustion engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons. The reciprocating movement of the pistons produces drive torque. Air is regulated and drawn into an intake manifold through a throttle. Fuel is injected by fuel injectors and the amount of injected fuel depends on a duration the fuel injectors are energized. Air and fuel are mixed outside or in combustion chambers of the cylinders to create an air and fuel mixture.

The air/fuel ratio of the mixture is controlled to meet different engine demands. For example, the engine may demand a stoichiometric air/fuel mixture (i.e., an air/fuel ratio of 14.7 for gasoline engines) in light load cruise situations. The engine may demand a rich air/fuel mixture (i.e., an air/fuel ratio less than 14.7 for gasoline engines) during cold start conditions.

The air/fuel ratio of the mixture in different cylinders, however, may vary due to different delivery rates of the injectors along a fuel rail. Due to manufacturing tolerances, the "same" injectors along the fuel rail may not deliver the same amount of fuel for a desired duration the injectors are open. The amount of fuel injected by the "same" injectors may vary by as much as ±5%, resulting in cylinder-to-cylinder air/fuel imbalance.

SUMMARY

Accordingly, an air/fuel imbalance detection module according to the present disclosure includes a fueling control module, a response time determination module, and a comparison module. The fueling control module commands a fueling change. The response time determination module determines a response time for a wide-range air/fuel sensor (WRAF) to output a predetermined output voltage. The comparison module compares the response time with a reference time range and diagnoses air/fuel imbalance when the response time is outside the reference time range.

In other features, the response time is a time period from a first time to a second time. The fueling control module commands the fueling change at the first time. The WRAF sensor outputs the predetermined output voltage at the second time. The fueling control module commands the fueling change according to a predetermined fueling pattern. The predetermined fueling pattern is a rich-burn combustion when an engine is in a lean-burn combustion prior to the fueling change and is a lean-burn combustion when the engine is in a rich-burn combustion prior to the fueling change.

A method of detecting air/fuel imbalance includes: commanding a fueling change according to a predetermined fueling pattern; determining a measured response time for a wide-range air/fuel sensor (WRAF) to output a predetermined voltage; comparing the measured response time with a predetermined range of reference response time; and diagnosing an air/fuel imbalance when the measured response time is outside the range of the reference response time.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
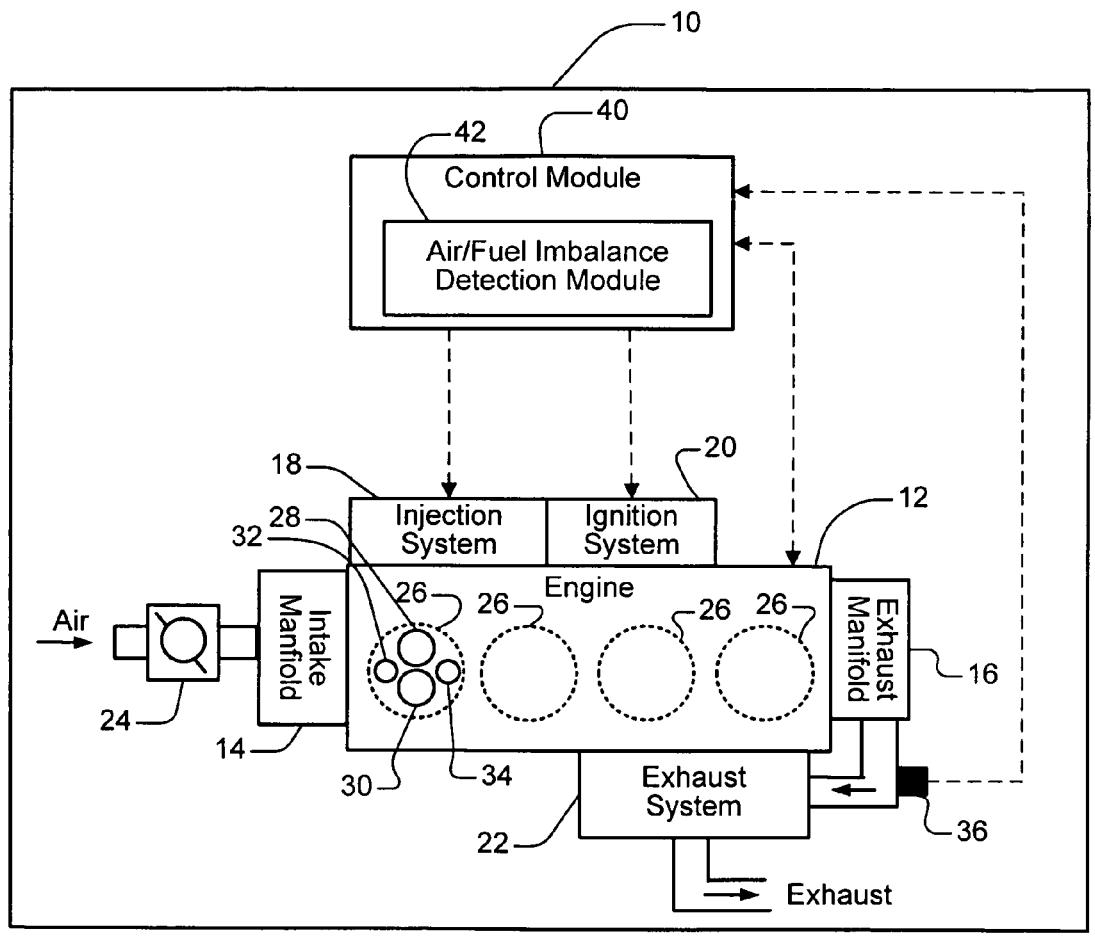
FIG. 1 is a functional block diagram of an engine system that includes an air/fuel imbalance detection module according to the teachings of the present disclosure.

The following description is merely exemplary in nature and is in no way intended to limit the disclosure, its application, or uses. For purposes of clarity, the same reference numbers will be used in the drawings to identify similar elements. As used herein, the term "module" refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An air/fuel imbalance detection module of the present disclosure commands a fueling change from a lean-burn combustion to a rich-burn combustion or vice versa depending on engine operating conditions. The air/fuel imbalance detection module determines a response time for a wide-range air/fuel sensor (WRAF) to generate a predetermined output voltage after the fueling change starts. The air/fuel imbalance detection module diagnoses an air/fuel imbalance when the response time is outside a reference time range.

Referring now to FIG. 1, an engine system 10 includes an engine 12, an intake manifold 14, an exhaust manifold 16, an injection system 18, an ignition system 20, and an exhaust system 22. The engine 12 may be, for example only, a gasoline engine, a diesel engine, a direct injection engine, or a port-fuel injection engine. Air is drawn through a throttle valve 24 into the intake manifold 14. The engine 12 may include multiple cylinders 26, such as, for example only, 2, 4, 6, 8, 10 and 12 cylinders. Only four cylinders 26 are shown in the illustrative example. Each cylinder 26 includes an intake valve 28, an exhaust valve 30, a fuel injector 32, and a spark plug 34. For the sake of clarity, one set of intake valve 28, exhaust valve 30, fuel injector 32, and spark plug 34 are shown. It is understood and appreciated that multiple intake valves 28 and exhaust valves 30 may be provided in each cylinder 26.

Air from the intake manifold 14 is drawn into the cylinder 26 of the engine 12 through the intake valve 28. The fuel injector 32 injects fuel that is mixed with the intake air outside or inside the combustion chambers of cylinders 26. The amount of fuel injected into the cylinder 26 depends on a duration the fuel injector 32 is energized. After the fuel is injected, the spark plug 34 is activated to ignite the air/fuel mixture within the cylinder 26. Thereafter, the exhaust valve 30 is opened to allow exhaust gas to flow to the exhaust system 22. A wide-range air/fuel (WRAF) sensor 36 is provided downstream from the exhaust manifold 16 and upstream from the exhaust system 22 for monitoring exhaust gases generated by individual cylinders 26. A control module 40 includes an air/fuel imbalance detection module 42. The air/fuel imbalance detection module 42 diagnoses air/fuel imbalance in a cylinder 26 based on signals from the WRAF sensor 36.

The WRAF sensor 36 is a type of wide-range oxygen sensor that generates linear output signals. The linear output signals indicate the oxygen content in the exhaust gas. The actual air/fuel ratio is determined based on the oxygen content in the exhaust gas. The WRAF sensor 36 outputs an increased voltage as the oxygen content in the exhaust gas is decreased (i.e., rich-fuel combustion) and a decreased voltage as the oxygen content is increased (i.e., lean-fuel combustion).

Figure 2:
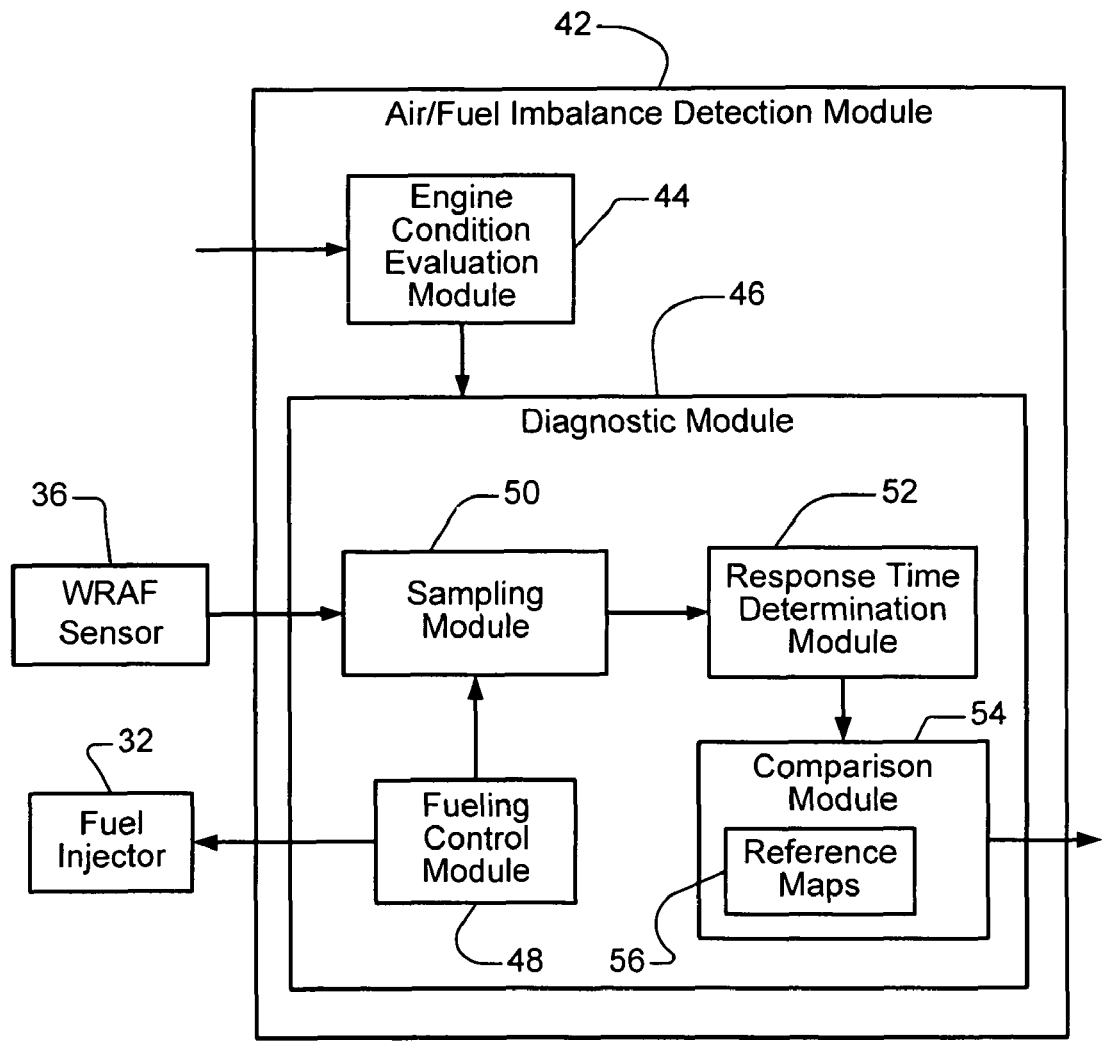
FIG. 2 is a functional block diagram of an air/fuel imbalance detection module according to the teachings of the present disclosure.

Referring to FIG. 2, the air/fuel imbalance detection module 42 includes an engine condition evaluation module 44 and a diagnostic module 46. The engine condition evaluation module 44 monitors the engine operating conditions and activates the diagnostic module 46 when enabling conditions are met. Enabling conditions are met when the engine runs under closed loop control, when the engine runs at a stable engine speed (RPM) for a prescribed period of time, and when the air/fuel ratio supplied to the engine 12 is stable. In other words, when the engine 12 runs in a steady state for a predetermined period of time, the enabling conditions are met.

The diagnostic module 46 includes a fueling control module 48, a sampling module 50, a response time determination module 52, and a comparison module 54. When the diagnostic module 46 is activated, the fueling control module 48 commands a fueling change for a specific cylinder being diagnosed according to a predetermined fueling pattern.

Figure 3:
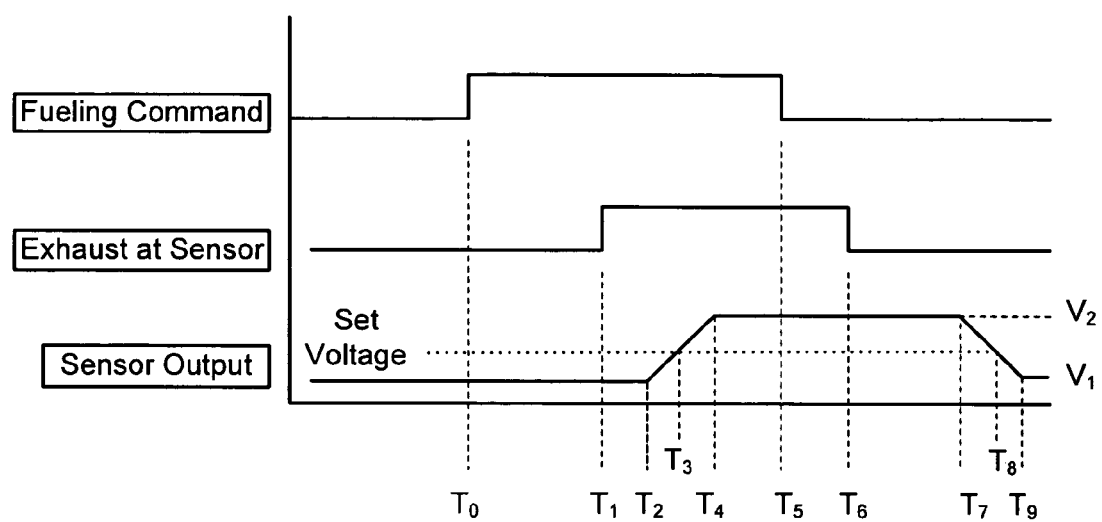
FIG. 3 is a schematic diagram illustrating timing of a fueling change command, timing of exhaust gas reaching a wide-range air/fuel (WRAF) sensor, and output signals from the WRAF sensor in response to the fueling change command.

Referring to FIG. 3, when the diagnosis starts in a lean-fuel condition, the predetermined fueling pattern is a rich-fuel combustion. The fueling control module 48 commands a fueling change at time $T_0$ from a lean-burn combustion to a rich-burn combustion. The sampling module 50 records the start time $T_0$. The fuel injector 32 for the cylinder 26 being diagnosed may be opened for a longer period to inject more fuel. When the engine 12 is transitioned from a lean-burn combustion to a rich-burn combustion, more oxygen reacts with the fuel. Therefore, the oxygen content in the exhaust gas is reduced. The exhaust gas with the reduced oxygen content does not reach the WRAF sensor 36 until time $T_1$ due to a travel delay (travel time) from the combustion chamber of the cylinder to the position of the WRAF sensor 36. The WRAF sensor 36 does not respond to the decreased oxygen content by changing its output voltage until the oxygen content in the WRAF sensor 36 has changed to a certain level (e.g. a specific quantity, content or volume).

During the lean-burn combustion, the WRAF sensor 36 outputs a voltage of $V_1$. The output voltage of the WRAF sensor 36 starts to increase at time $T_2$. The output voltage of the WRAF sensor 36 reaches a predetermined output voltage (i.e., a set voltage) at time $T_3$, which is recorded by the sampling module 50. The output voltage of the WRAF sensor 36 continues to increase until the oxygen content detected by the WRAF sensor 36 is the same as that in the exhaust gas at time $T_4$. The WRAF sensor 36 starts to output a constant voltage $V_2$ at time $T_4$. The predetermined output voltage may be any selected voltage between the start voltage $V_1$ and the end voltage $V_2$.

The sampling module 50 records a first time (i.e., $T_0$) when fueling change starts and a second time (i.e., $T_3$) when the WRAF sensor 36 reaches the predetermined output voltage. The response time ($T_0$-$T_3$) is defined as the period from the first time when the fueling change starts to the second time when the WRAF sensor 36 outputs the predetermined output voltage. The response time determination module 52 determines a response time based on the first time and the second time (i.e., $T_3$-$T_0$).

The comparison module 54 includes a plurality of reference maps 56 that include data of acceptable response times for different engine conditions including, but not limited to, engine speeds and engine loads. The data are obtained from cylinders that operate under different acceptable air/fuel ratios. The reference maps 56 include data indicating the fastest and the slowest response time the WRAF sensor 36 may have or experience when the cylinder 26 operates with a balanced air/fuel mixture. The fastest and the slowest response times define an acceptable time range. In other words, the fastest and the slowest response times define a lower limit and an upper limit of the acceptable time range, respectively. The acceptable response time range varies with engine configuration and operating conditions.

The comparison module 54 identifies the appropriate reference map 56 that corresponds to the engine operating conditions (for example, based on the engine RPM and an MAP) and compares the measured response time with the acceptable time range on the map 56. When the measured response time is outside the reference time range, the comparison module 54 diagnoses an air/fuel imbalance in the cylinder being monitored. The comparison module 54 may also send a signal indicating the fault to an alarm to alert the driver and to a memory for later diagnosis, study or evaluation.

Figure 4:
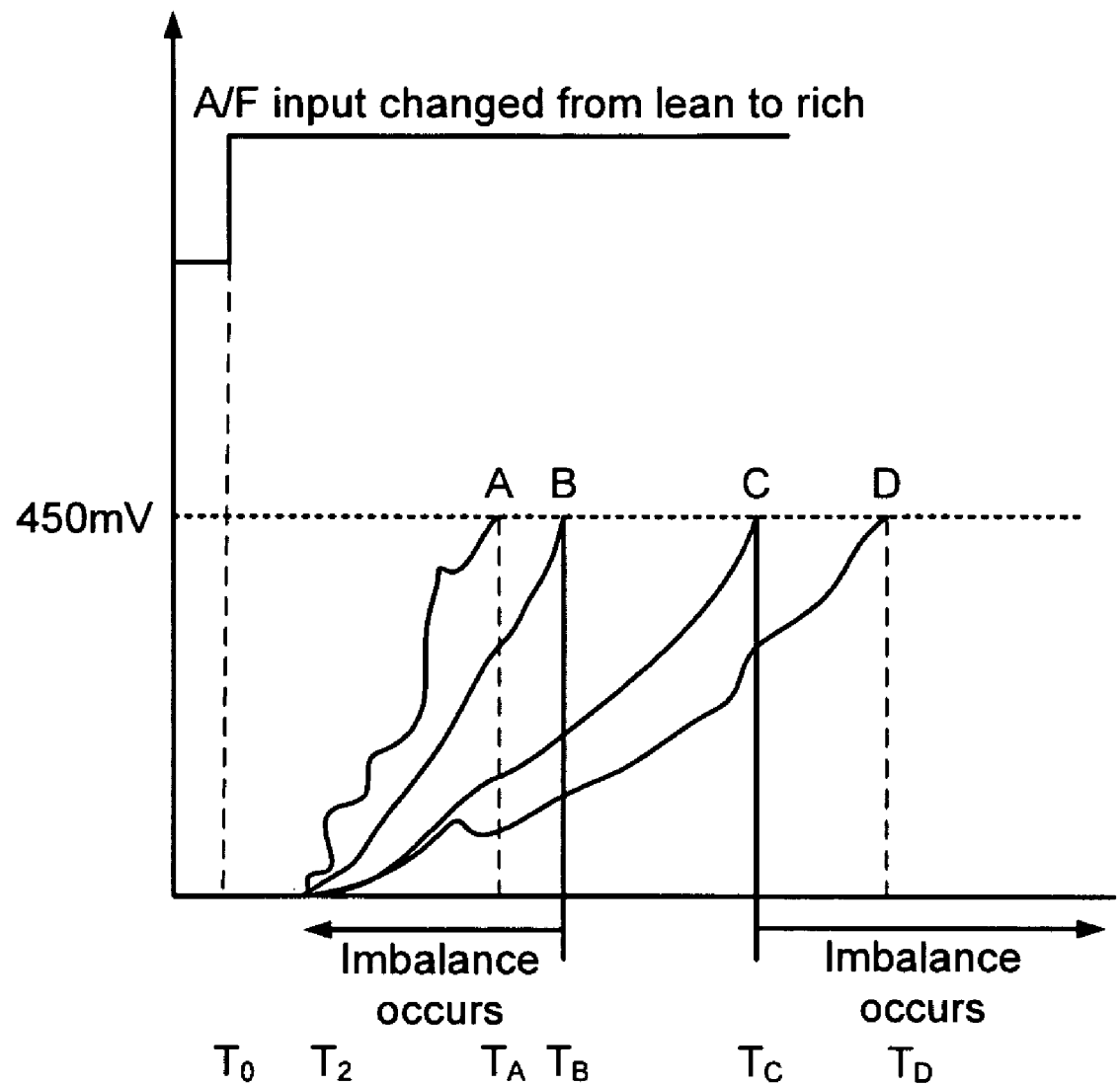
FIG. 4 is a graph showing output signals of a wide-range air/fuel sensor (WRAF) sensor in response to exhaust gas generated by two cylinders with balanced air/fuel ratio and two cylinders with imbalanced air/fuel ratio.

FIG. 4 illustrates an example of a reference time range on the reference map 56. Curves A, B, C and D represent output signals of a WRAF sensor 36 in response to exhaust gas generated by respective cylinders. Each cylinder corresponds to one of curves A, B, C, and D, and so reference may also be made to cylinders A, B, C, and D.

The fueling change starts at time To and the WRAF sensor 36 begins to output an increased voltage at time $T_2$. The WRAF sensor 36 outputs the predetermined output voltage (for example, 450 mV) in response to the exhaust gas generated by cylinders A, B, C, and D, at times $T_A$, $T_B$, $T_C$, and $T_D$, respectively. Cylinders B and C are operated with acceptable (i.e., balanced) air/fuel ratios. The WRAF sensor 36 has the fastest acceptable response time ($T_B$-$T_0$) and the slowest acceptable response time ($T_C$-$T_0$). With respect to curve A, the WRAF sensor 36 has a response time faster than the lower limit defined by curve B. Therefore, cylinder A is diagnosed to operate with an imbalanced air/fuel ratio. With respect to curve D, the WRAF sensor 36 has a response time slower than the upper limit defined by curve C. Therefore, cylinder D is diagnosed to operate with an imbalanced air/fuel ratio. When a measured response time is located in an area between curves B and C, the cylinder is diagnosed to operate with a balanced air/fuel ratio.

Referring again to FIG. 3, the predetermined fueling pattern is a lean-burn combustion when the diagnosis starts in a rich-burn condition. The fueling control module 48 changes the fueling from a rich-burn combustion to a lean-burn combustion at time $T_5$. The exhaust gas generated by the cylinder 26 with the rich fuel mixture reaches the position of the WRAF sensor 36 at time $T_6$. The WRAF sensor 36 begins to output a decreased voltage in response to the increased oxygen content in the exhaust gas at time $T_7$. The output voltage of the WRAF sensor 36 reaches the predetermined voltage at time $T_8$. The response time is defined as $T_8$-$T_5$. The WRAF sensor 36 outputs a constant voltage $V_1$ at time $T_9$ when the oxygen content in the WRAF sensor 36 is the same as that in the exhaust gas. The sampling module 50 records the start time of fueling change ($T_5$) and the time the WRAF sensor 36 outputs the predetermined voltage ($T_8$). The response time determination module 52 determines the response time ($T_8$-$T_5$). The comparison module 54 identifies an appropriate reference map 56 and compares the response time with the data on the reference map 56. The comparison module 54 diagnoses an air/fuel imbalance in a cylinder 26 when the response time is outside the reference range on the reference map 56.

In the illustrative example, the response time is measured from the time when a fueling change starts. The fueling change starts when the fueling control module 48 commands a fueling change from lean-burn to rich-burn (at time $T_0$) or from rich-burn to lean-burn (at time $T_5$). It is understood and appreciated that the start time can be a different definable time before or after the fueling change starts. For example, the response time may be measured from the time the diagnostic module 46 is activated, or from the time the output voltage of the WRAF sensor 36 starts to change (i.e., $T_2$ or $T_7$).

Figure 5:
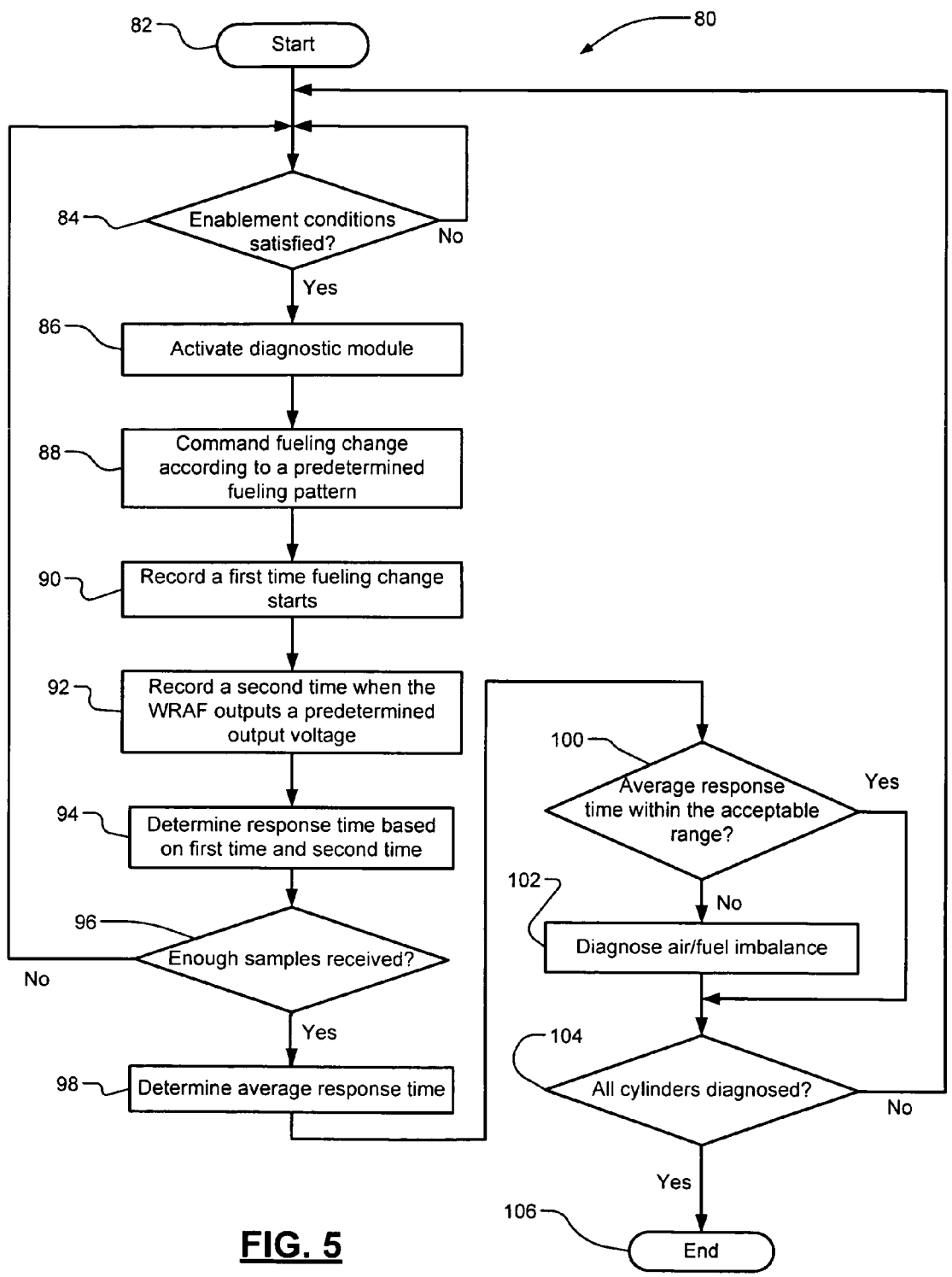
FIG. 5 is a flow diagram illustrating exemplary steps of a method of diagnosing air/fuel imbalance in cylinders according to the teachings of the present disclosure.

Referring now to FIG. 5, a method 80 of diagnosing air/fuel imbalance in cylinders 26 starts in step 82. The engine condition evaluation module 44 determines whether the enabling conditions are met in step 84. When the enabling conditions are met, the diagnostic module 46 is activated in step 86. The fueling control module 48 commands a fueling change according to a predetermined pattern in step 88. The fueling may be changed from a lean mixture to a rich mixture or from a rich mixture to a lean mixture, depending on engine operating conditions. The sampling module 50 records the first time the fueling change starts in step 90. The sampling module 50 receives data from the WRAF sensor 36 and records a second time the output voltage reaches the predetermined output voltage in step 92. The response time determination module 52 determines a response time based on the first time and the second time in step 94. If sampling module 50 does not receive enough samples (for example only, six samples) in step 96, the method 80 returns to step 84 until enough samples are received. The response time determination module 52 determines an average of the response time based on the plurality of samples in step 98. The comparison module 54 compares the average response time with the reference time range on the reference map 56 in step 100. When the response time is outside the reference range (i.e., below the lower limit or above the upper limit of the reference range) in step 100, the comparison module 54 diagnoses an air/fuel imbalance in the particular cylinder being monitored in step 102. If not all cylinders are diagnosed in step 104, the method 80 returns to step 84 to continue to diagnose a next cylinder 26 if the enabling conditions are still present. If all cylinders 26 are diagnosed in step 104, the method 80 ends in step 106.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An air/fuel imbalance detection module comprising:
    a fueling control module that commands a fueling change;
    a response time determination module that determines a response time for a wide-range air/fuel sensor (WRAF) to output a predetermined output voltage; and
    a comparison module that compares the response time with a reference time range and diagnoses air/fuel imbalance when the response time is outside the reference time range.

2. The air/fuel imbalance detection module of claim 1 wherein the response time is a time period from a first time to a second time, wherein the fueling control module commands the fueling change at the first time and the WRAF sensor outputs the predetermined output voltage at the second time.

3. The air/fuel imbalance detection module of claim 1 wherein the fueling controls the fueling change according to a predetermined fueling pattern depending on engine operating conditions.

4. The air/fuel imbalance detection module of claim 3 wherein the predetermined fueling pattern is a rich-burn combustion when an engine is a lean-burn combustion prior to the fueling change.

5. The air/fuel imbalance detection module of claim 3 wherein the predetermined fueling pattern is a lean-burn combustion when an engine is in a rich-burn combustion prior to the fueling change.

6. The air/fuel imbalance detection module of claim 1 wherein the predetermined voltage is between a first output voltage and a second output voltage, wherein the WRAF sensor outputs the first output voltage before the fueling change and outputs the second voltage after the WRAF sensor outputs a constant output voltage after the fueling change.

7. The air/fuel imbalance detection module of claim 6 wherein the predetermined voltage is greater than the first output voltage when the fueling change is commanded from a lean-burn combustion to a rich-burn combustion.

8. The air/fuel imbalance detection module of claim 6 wherein the predetermined voltage is smaller than the first output voltage when the fueling change is commanded from a rich-burn combustion to a lean-burn combustion.

9. The air/fuel imbalance detection module of claim 1 further comprising an engine condition evaluation module that activates the fueling control module and the comparison module when the engine runs at steady state.

10. The air/fuel imbalance detection module of claim 1 wherein the reference time range varies with engine speed and engine load.

11. An air/fuel imbalance detection module comprising:
    a fueling control module that commands a fueling change at a first time according to a predetermined fueling pattern;
    a sampling module that determines a second time when a wide-range air/fuel sensor (WRAF) outputs a predetermined output voltage at a second time;
    a response time determination module that determines a response time based on the first time and the second time;

a comparison module that includes reference data indicative of a lower limit and an upper limit of a reference time range and that compares the response time with the lower limit and the upper limit, wherein the comparison module diagnoses air/fuel imbalance when the measured response time is below the lower limit or above the upper limit.

12. A method of detecting air/fuel imbalance comprising:
commanding a fueling change according to a predetermined fueling pattern;
determining a measured response time for a wide-range air/fuel sensor (WRAF) to output a predetermined voltage;
comparing the measured response time with a predetermined range of reference response time; and
diagnosing an air/fuel imbalance when the measured response time is outside the range of the reference response time.

13. The method of claim 12 wherein the predetermined fueling pattern includes transitioning from a lean-burn combustion to a rich-burn combustion.

14. The method of claim 12 wherein the predetermined fueling pattern includes transitioning from a rich-burn combustion to a lean-burn combustion.

15. The method of claim 12 further comprising measuring a first time when the fueling change is commanded.

16. The method of claim 15 further comprising measuring a second time when the WRAF sensor outputs a predetermined voltage.

17. The method of claim 16 further comprising determining the measured response time based on the first time and the second time.

18. The method of claim 12 further comprising diagnosing the air/fuel imbalance when the measured response time is below a lower limit or above an upper limit of the reference time range.

19. The method of claim 12 further comprising starting a diagnosis when the engine runs at a steady state.

* * * * *